United States Patent
Yofune et al.

(10) Patent No.: US 11,013,032 B2
(45) Date of Patent: May 18, 2021

(54) WIRELESS COMMUNICATION DEVICE AND COMMUNICATION PARAMETER REPORT METHOD

(71) Applicant: Mobile Techno Corp., Yokohama (JP)

(72) Inventors: Masanori Yofune, Ota (JP); Masayuki Suto, Yokohama (JP); Yasuharu Amezawa, Kawasaki (JP)

(73) Assignee: MOBILE TECHNO CORP., Kanagawa (JP)

( * ) Notice: Subject to any disclaimer, the term of this patent is extended or adjusted under 35 U.S.C. 154(b) by 0 days.

(21) Appl. No.: 16/525,803

(22) Filed: Jul. 30, 2019

(65) Prior Publication Data

US 2020/0084801 A1 Mar. 12, 2020

(30) Foreign Application Priority Data

Sep. 10, 2018 (JP) .............................. JP2018-169058

(51) Int. Cl.
*H04W 74/08* (2009.01)
*H04L 1/00* (2006.01)
(Continued)

(52) U.S. Cl.
CPC ...... *H04W 74/0808* (2013.01); *H04B 17/336* (2015.01); *H04L 1/0003* (2013.01); *H04L 1/0026* (2013.01); *H04L 5/0055* (2013.01)

(58) Field of Classification Search
CPC ............. H04W 74/0808; H04L 1/0003; H04L 5/0055; H04L 1/0026; H04L 1/1812;
(Continued)

(56) References Cited

U.S. PATENT DOCUMENTS 6,625,172 B2 * 9/2003 Odenwalder ......... H04L 1/1829
370/474
7,155,655 B2 * 12/2006 Cheng .................. H04L 1/1825
714/748
(Continued)

FOREIGN PATENT DOCUMENTS

JP 2006-197032 A 7/2006
JP 2007-019729 A 1/2007
(Continued)

OTHER PUBLICATIONS

Cheng et al. "Adaptive Incremental Redundancy", 2003, IEEE 58th Vehicular Technology Conference, (Year: 2003).*
(Continued)

*Primary Examiner* — Harry H Kim
(74) *Attorney, Agent, or Firm* — Myers Wolin, LLC

(57) ABSTRACT

A wireless communication device includes a processor. The processor estimates a quality of a received signal that is transmitted from a source device. The processor determines a communication parameter for a next communication transaction based on an evaluation value that indicates a result of subtracting a second value from a first value, the first value being determined based on a coding rate and a data length of a data signal received from the source device, the second value being determined based on the data length, a modulation scheme and a quality of the data signal. The processor reports the communication parameter to the source device.

5 Claims, 16 Drawing Sheets

(51) Int. Cl.
*H04B 17/336* (2015.01)
*H04L 5/00* (2006.01)
*H04L 1/16* (2006.01)

(58) Field of Classification Search
CPC ... H04L 1/1671; H04L 1/0025; H04L 1/0009; H04B 17/336
See application file for complete search history.

(56) References Cited

U.S. PATENT DOCUMENTS

| | | |
|---|---|---|
| 2005/0276266 A1 | 12/2005 | Terry |
| 2008/0294967 A1* | 11/2008 | Tomlinson ........ H03M 13/3738 714/800 |
| 2009/0323592 A1 | 12/2009 | Terry |
| 2010/0067499 A1 | 3/2010 | Oota |
| 2011/0007834 A1 | 1/2011 | Hoshino et al. |
| 2012/0243485 A1 | 9/2012 | Merlin et al. |
| 2013/0170345 A1 | 7/2013 | Merlin et al. |
| 2013/0223210 A1 | 8/2013 | Asterjadhi et al. |
| 2013/0223211 A1 | 8/2013 | Asterjadhi et al. |
| 2013/0223212 A1 | 8/2013 | Asterjadhi et al. |
| 2013/0223213 A1 | 8/2013 | Asterjadhi et al. |
| 2013/0223338 A1 | 8/2013 | Asterjadhi et al. |
| 2013/0223345 A1 | 8/2013 | Asterjadhi et al. |
| 2013/0227371 A1 | 8/2013 | Asterjadhi et al. |
| 2013/0294251 A1 | 11/2013 | Hoshino et al. |
| 2014/0281781 A1 | 9/2014 | Terry |
| 2014/0301208 A1 | 10/2014 | Merlin et al. |
| 2015/0074482 A1 | 3/2015 | Hoshino et al. |
| 2016/0135162 A1 | 5/2016 | Hoshino et al. |
| 2016/0192363 A1 | 6/2016 | Kasher et al. |
| 2016/0330757 A1 | 11/2016 | Cherian et al. |
| 2017/0134147 A1 | 5/2017 | Terry |
| 2017/0164241 A1 | 6/2017 | Kasher et al. |
| 2018/0103396 A1 | 4/2018 | Kasher et al. |

FOREIGN PATENT DOCUMENTS

| | | |
|---|---|---|
| JP | 2008-503183 A | 1/2008 |
| JP | 2010-074469 A | 4/2010 |
| JP | 2014-131298 A | 7/2014 |
| JP | 2015-529047 A | 10/2015 |
| JP | 2015-216682 A | 12/2015 |
| JP | 2018-517344 A | 6/2018 |
| JP | 2018-107820 A | 7/2018 |
| WO | 2005/125109 A2 | 12/2005 |
| WO | 2014/014577 A1 | 1/2014 |
| WO | 2016/179276 A1 | 11/2016 |

OTHER PUBLICATIONS

Cheng, "Coding Performance of Hybrid ARQ Schemes", Jun. 2006, IEEE Transaction on Communications, vol. 54, No. 6 (Year: 2006).*
Cheng et al. IEEE Vth 2003-Fall (Year: 2003).*
The Extended European Search Report issued by the European Patent Office for corresponding patent application 19188796.7 dated Jun. 16, 2020, and received by an individual under 37 CFR 1.56(c)(3) dated Jun. 24, 2020.
Gavin Holland et al, "A Rate-Adaptive MAC Protocol for Multi-Hop Wireless Networks", ACM SIGMOBILE, pp. 236-250, Jul. 2001, Rome, Italy.
Saiid Biaz et al; "Rate Adaptation Algorithms for IEEE 802.11 Networks: A Survey and Comparison", 2008 IEEE, Shelby Center for Engineering Technology, Suite 3101, Computer Science and Software Engineering Department, Auburn University, 107 Dunstan Hall, Auburn University, AL, 36849-5347, USA, IEEE 2008.
Partial European search report issued by the European Patent Office for corresponding European Patent Application No. 19188796.7-1220, dated Jan. 29, 2020.
Cheng et al., "Adaptive incremental redundancy", Vehicular Technology Conference, vol. 2., pp. 737-741, ISBN:978-0-7803-7954-3, Orlando, FL, USA, Oct. 6-9, 2003, cited in the Partial European Search Report dated Jan. 29, 2020.

* cited by examiner

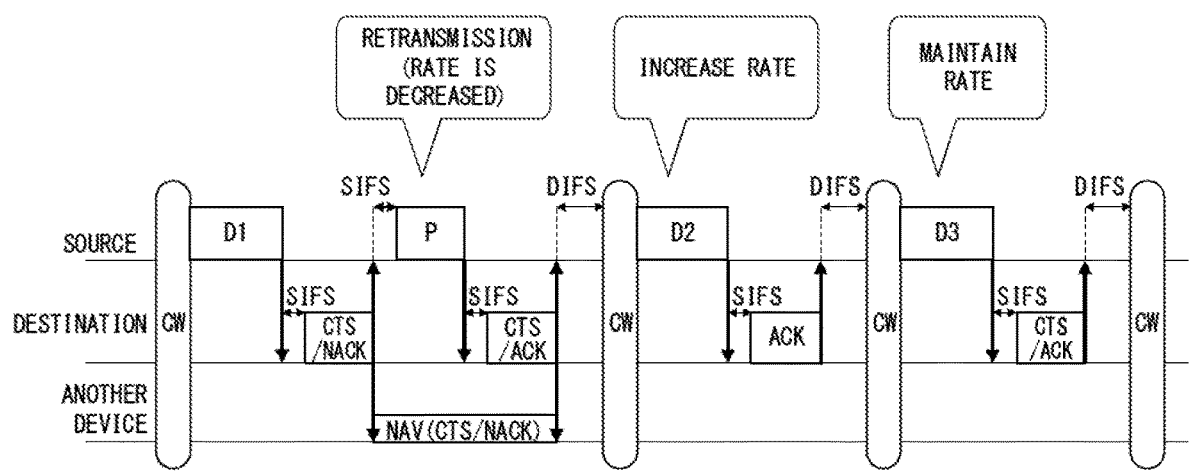
F I G. 3

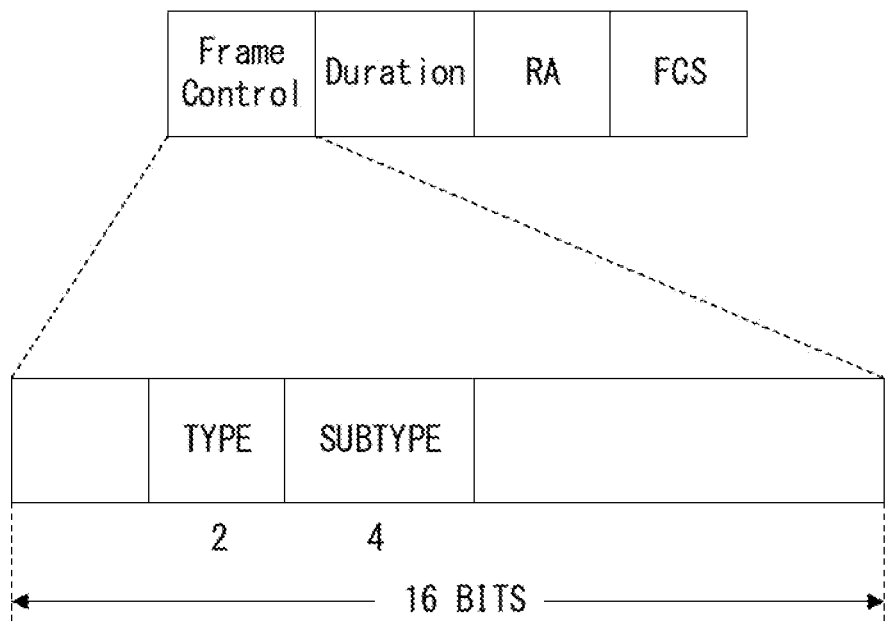
F I G. 4

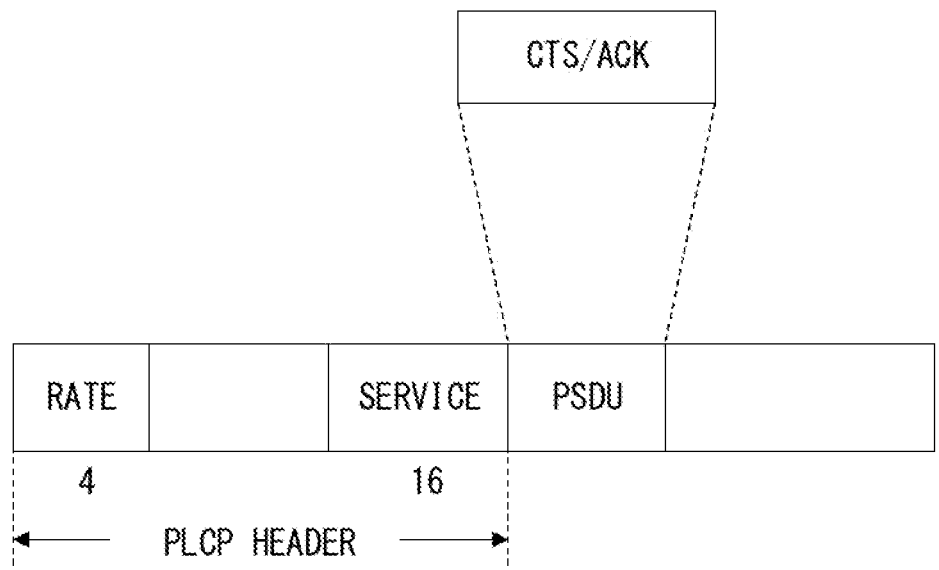
F I G. 5

| COMMUNICATION PATTERN NO. | SETTINGS OF CTS | | | DETAILS RECOGNIZED BY SOURCE DEVICE |
|---|---|---|---|---|
| | RATE | 11a/g PATTERN | | |
| | bit0-3 | MODULATION | CODING RATE | |
| 1 | 1101 | BPSK | 1/2 | BPSK IN RETRANSMISSION |
| 2 | 1111 | BPSK | 3/4 | QPSK IN RETRANSMISSION |
| 3 | 0101 | QPSK | 1/2 | 16QAM IN RETRANSMISSION |
| 4 | 0111 | QPSK | 3/4 | 64QAM IN RETRANSMISSION |

FIG. 6A

| COMMUNICATION PATTERN NO. | SETTINGS OF CTS | | | DETAILS RECOGNIZED BY SOURCE DEVICE |
|---|---|---|---|---|
| | RATE | 11a/g PATTERN | | |
| | bit0-3 | MODULATION | CODING RATE | |
| 1 | 1101 | BPSK | 1/2 | BPSK AND DECREASE CODING RATE BY N |
| 2 | 1111 | BPSK | 3/4 | BPSK AND INCREASE CODING RATE BY N |
| 3 | 0101 | QPSK | 1/2 | QPSK AND DECREASE CODING RATE BY N |
| 4 | 0111 | QPSK | 3/4 | QPSK AND INCREASE CODING RATE BY N |
| 5 | 1001 | 16QAM | 1/2 | 16QAM AND DECREASE CODING RATE BY N |
| 6 | 1011 | 16QAM | 3/4 | 16QAM AND INCREASE CODING RATE BY N |
| 7 | 0001 | 64QAM | 2/3 | 64QAM AND DECREASE CODING RATE BY N |
| 8 | 0011 | 64QAM | 3/4 | 64QAM AND INCREASE CODING RATE BY N |

FIG. 6B

| COMMUNICATION PATTERN NO. | SETTINGS OF CTS | | | DETAILS RECOGNIZED BY SOURCE DEVICE |
|---|---|---|---|---|
| | RATE | 11a/g PATTERN | | |
| | bit0-3 | MODULATION | CODING RATE | |
| 1 | 1101 | BPSK | 1/2 | MAINTAIN MODULATION ORDER AND DECREASE CODING RATE BY N |
| 2 | 1111 | BPSK | 3/4 | MAINTAIN CODING RATE AND DECREASE MODULATION ORDER BY N |
| 3 | 0101 | QPSK | 1/2 | MAINTAIN MODULATION ORDER AND INCREASE CODING RATE BY N |
| 4 | 0111 | QPSK | 3/4 | MAINTAIN CODING RATE AND INCREASE MODULATION ORDER BY N |

FIG. 6C

| COMMUNICATION PATTERN NO. | SETTINGS | | | | | | | MODULATION | CODING RATE |
|---|---|---|---|---|---|---|---|---|---|
| | SCRAMBLER INITIAL VALUE | | | | | | | | |
| | bit0 | bit1 | bit2 | bit3 | bit4 | bit5 | bit6 | | |
| 1 | 0 | 0 | 0 | 0 | PSEUDORANDOM NUMBERS | | | BPSK | 1/3 |
| 2 | 0 | 0 | 0 | 1 | | | | BPSK | 1/2 |
| 3 | 0 | 0 | 1 | 0 | | | | BPSK | 2/3 |
| 4 | 0 | 0 | 1 | 1 | | | | BPSK | 5/6 |
| 5 | 0 | 1 | 0 | 0 | PSEUDORANDOM NUMBERS | | | QPSK | 1/3 |
| 6 | 0 | 1 | 0 | 1 | | | | QPSK | 1/2 |
| 7 | 0 | 1 | 1 | 0 | | | | QPSK | 2/3 |
| 8 | 0 | 1 | 1 | 1 | | | | QPSK | 5/6 |
| 9 | 1 | 0 | 0 | 0 | PSEUDORANDOM NUMBERS | | | 16QAM | 1/3 |
| 10 | 1 | 0 | 0 | 1 | | | | 16QAM | 1/2 |
| 11 | 1 | 0 | 1 | 0 | | | | 16QAM | 2/3 |
| 12 | 1 | 0 | 1 | 1 | | | | 16QAM | 5/6 |
| 13 | 1 | 1 | 0 | 0 | PSEUDORANDOM NUMBERS | | | 64QAM | 1/3 |
| 14 | 1 | 1 | 0 | 1 | | | | 64QAM | 1/2 |
| 15 | 1 | 1 | 1 | 0 | | | | 64QAM | 2/3 |
| 16 | 1 | 1 | 1 | 1 | | | | 64QAM | 5/6 |
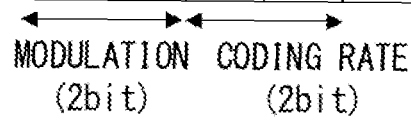
MODULATION (2bit)   CODING RATE (2bit)
F I G. 7

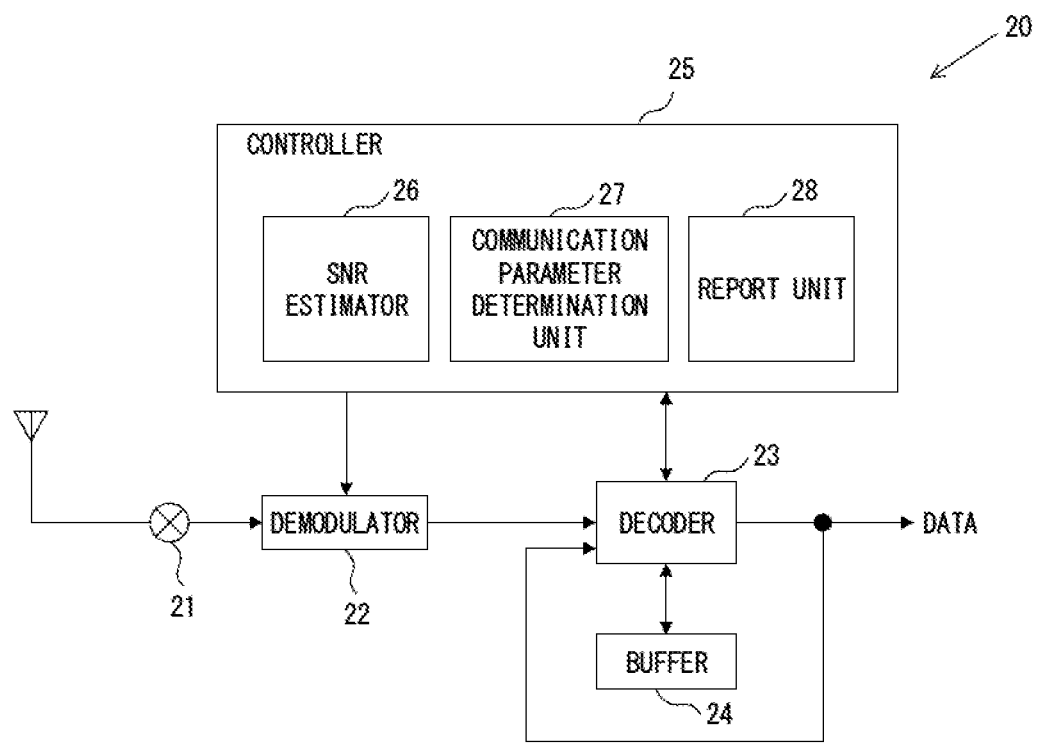
F I G. 9

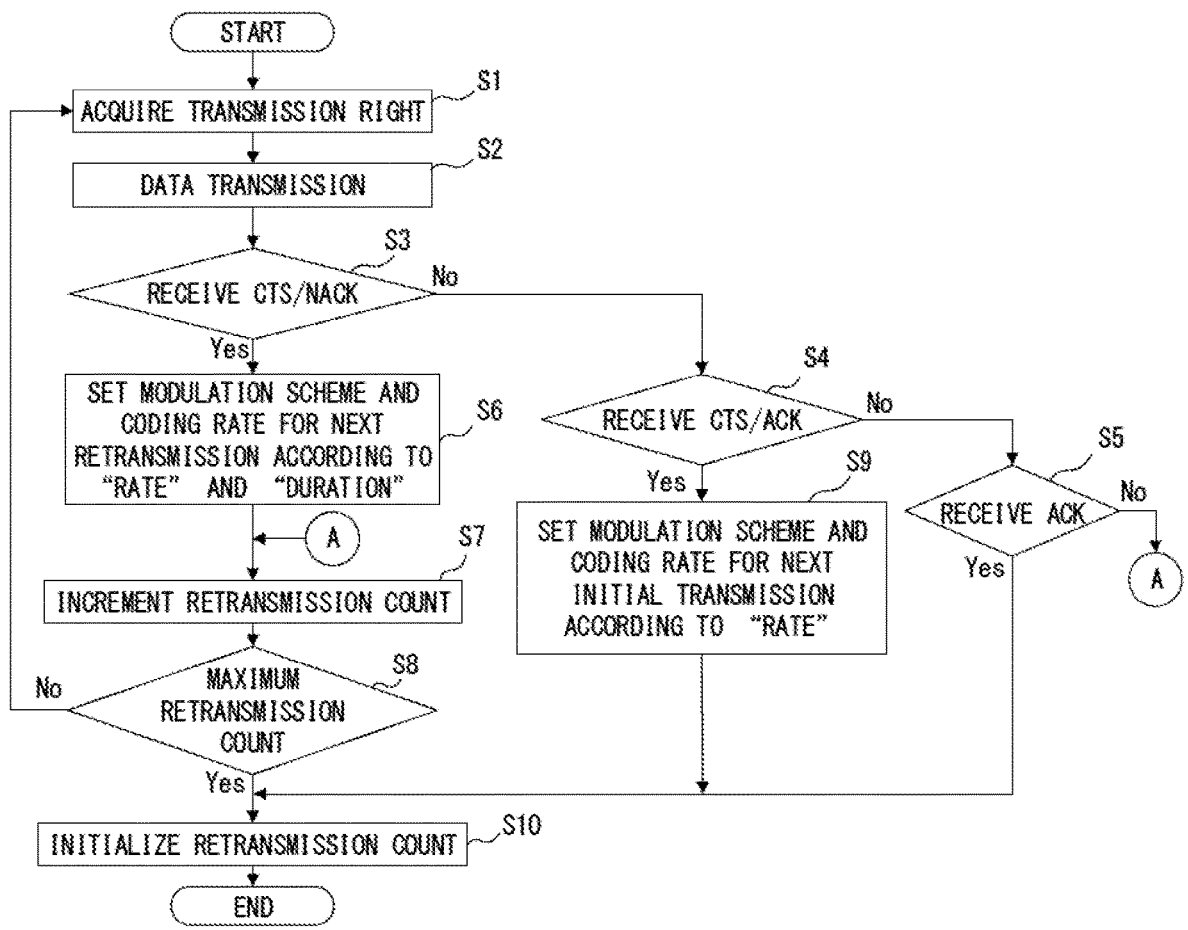
F I G. 11

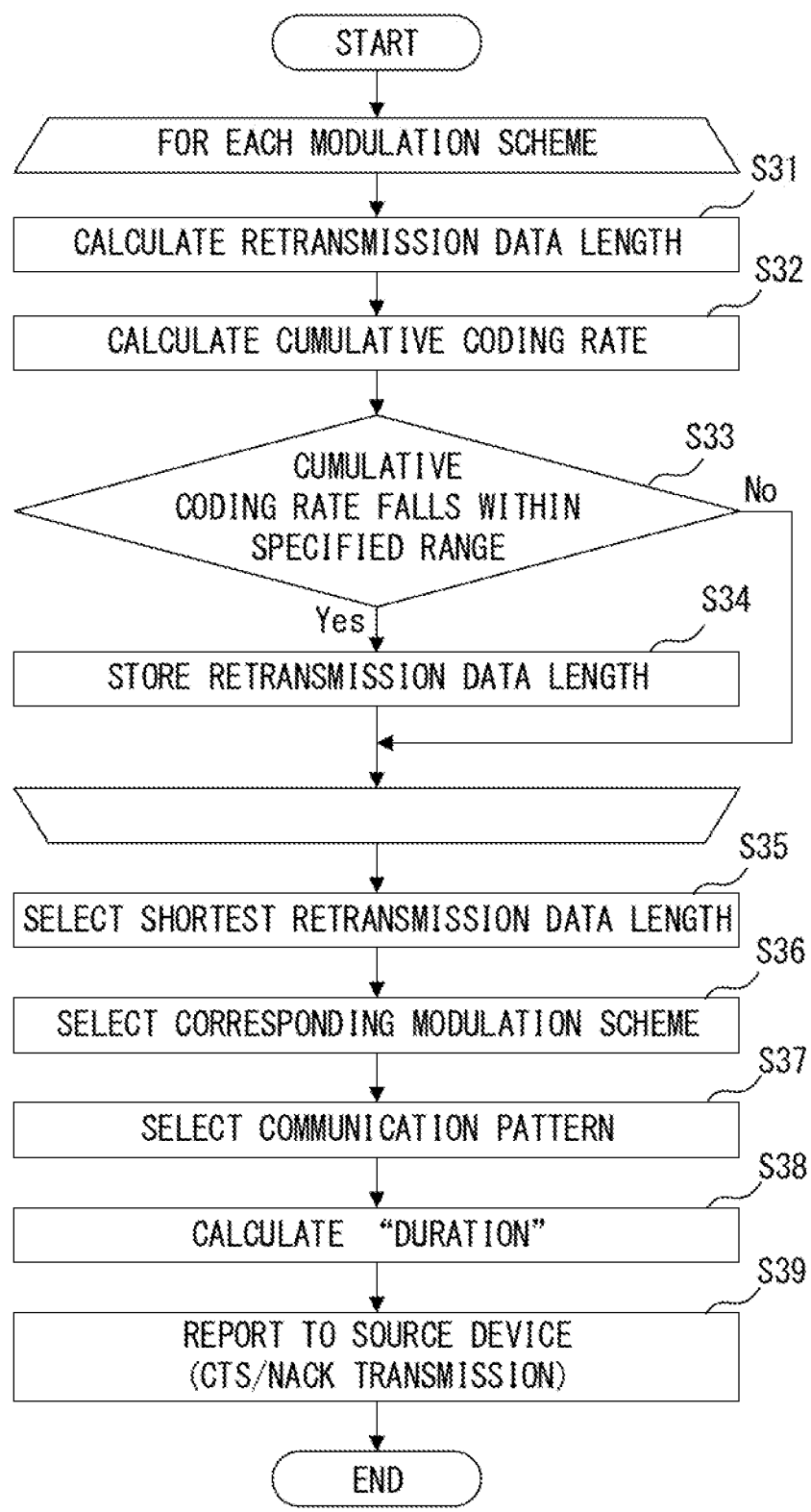
F I G. 1 3

WIRELESS COMMUNICATION DEVICE AND COMMUNICATION PARAMETER REPORT METHOD

CROSS-REFERENCE TO RELATED APPLICATION

This application is based upon and claims the benefit of priority of the prior Japanese Patent Application No. 2018-169058, filed on Sep. 10, 2018, the entire contents of which are incorporated herein by reference.

FIELD

The embodiments discussed herein are related to a wireless communication device and a method for reporting a communication parameter.

BACKGROUND

Proposed algorithms for maximizing a throughput of an application in a wireless communication system include, for example, auto rate fallback (ARF) and receiver-based auto rate (RBAR). According to ARF, a source device selects a transmission rate in accordance with the number of successful transmissions in the past and/or the number of unsuccessful transmissions in the past. According to RBAR, a destination device determines a transmission rate based on the signal-to-noise ratio (SNR) of a received signal. The determined transmission rate is reported from the destination device to a source device by using a control frame. The source device performs a data transmission at the reported transmission rate.

ARF and RBAR are disclosed by, for example, S. Biaz et al., "Rate Adaptation Algorithms for IEEE 802.11 Networks: A Survey and Comparison", IEEE, 2008. Adaptively varying a modulation scheme and a coding rate according to a reception quality is disclosed in, for example, Japanese Laid-open Patent Publication No. 2014-131298. Selecting a modulation parameter based on a data length and the status of a propagation path is disclosed in, for example, Japanese Laid-open Patent Publication No. 2007-019729.

According to ARF, as described above, a transmission rate is selected in accordance with the number of successful transmissions in the past and/or the number of unsuccessful transmissions in the past. For example, the rate may be increased when a frame transmission consecutively succeeds a specified number of times, and the rate may be decreased when a frame transmission consecutively fails a specified number of times. Hence, when, for example, a wireless environment is varied, a long time may be required to select the maximum rate. That is, the capability to follow rate control may be low.

According to RBAR, as described above, a new transmission rate is reported from a destination device to a source device by using a specified control frame. However, some of existing wireless communication devices may be incapable of transmitting such a control frame. For example, a procedure for reporting a transmission rate by using the "Duration" area in a Clear to Send (CTS) frame may be proposed for wireless LAN systems. In particular, the transmission rate is reported by changing the definition of the "Duration" area. Hence, an existing wireless LAN device may be incapable of identifying a transmission rate determined by a destination device.

SUMMARY

According to an aspect of the embodiments, a wireless communication device includes a processor configured to estimate a quality of a received signal that is transmitted from a source device, to determine a communication parameter for a next communication transaction based on an evaluation value that indicates a result of subtracting a second value from a first value, the first value being determined based on a coding rate and a data length of a data signal received from the source device, the second value being determined based on the data length, a modulation scheme and a quality of the data signal, and to report the communication parameter to the source device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a data transmission in accordance with embodiments of the invention;

FIG. 4 illustrates an example of a control frame to be used in the wireless communication system depicted in FIG. 3;

FIG. 5 illustrates an example of a PLCP header;

FIGS. 6A, 6B and 6C illustrate examples of methods for reporting a data rate for a next communication transaction;

FIG. 7 illustrates another example of a method for reporting a data rate for a next communication transaction;

FIG. 9 illustrates an example of a receiver implemented in a wireless communication device;

FIG. 11 is a flowchart illustrating an example of process performed by a source device;

FIG. 13 is a flowchart illustrating an example of a process of determining a retransmission rate.

DESCRIPTION OF EMBODIMENTS

Figure 1:
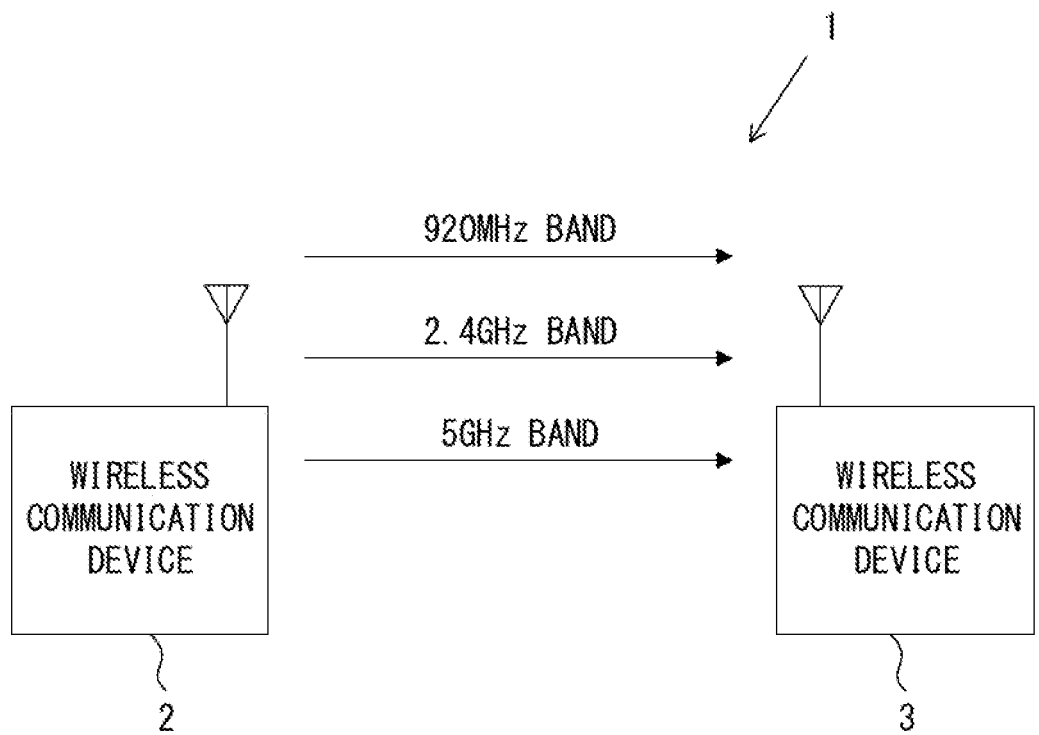
FIG. 1 illustrates an example of a wireless communication system in accordance with embodiments of the present invention.

FIG. 1 illustrates an example of a wireless communication system in accordance with embodiments of the present invention. For example, a wireless communication system 1 depicted in FIG. 1 may be, but is not particularly limited to, a wireless LAN system. The wireless communication system 1 includes wireless communication devices 2 and 3. Each of the wireless communication devices 2 and 3 is, for example, a user equipment. The user equipment may be a mobile terminal. The wireless communication system 1 uses Carrier Sense Multiple Access Collision Avoidance (CSMA/CA) to avoid a packet collision. Note that the retransmission control described hereinafter is performed in the wireless LAN.

The wireless communication devices 2 and 3 may transmit data by using a plurality of frequency bands. In particular, the wireless communication devices 2 and 3 may transmit data by concurrently using a plurality of frequency bands. In this example, the wireless communication devices 2 and 3 may transmit data by using one frequency band among a 920 MHz band, a 2.4 GHz band, and a 5 GHz band or may transmit data by concurrently using two or more of these frequency bands. The quality of a communication between the wireless communication devices 2 and 3 is varied according to frequency band. Hence, the wireless communication devices 2 and 3 may transmit data by using a different modulation scheme and a different code according to frequency band.

A source device in a system that uses CSMA/CA checks, before starting a data transmission, whether a wireless resource is being used by another terminal. The source device transmits a data signal when a wireless resource is not being used by another terminal. In this procedure, a packet collision is avoided. However, a packet collision may occur when a plurality of devices concurrently start data transmissions or when a hidden terminal is present. A destination device fails data reception when a packet collision occurs.

When data reception has failed, retransmission control is performed between the source device and the destination device. The retransmission control is implemented by, for example, Hybrid Automatic Repeat Request (HARQ). HARQ may perform a retransmission control with IR (incremental redundancy).

Figure 2A:
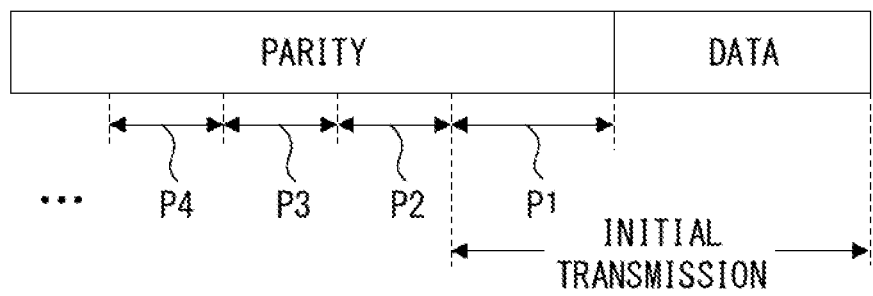
FIGS. 2A and 2B illustrate an outline of retransmission control with IR (Incremental Redundancy)

As depicted in FIG. 2A, a portion of a coded bit string is transmitted in an initial transmission in the wireless communication system 1 that performs retransmission control with IR. The coded bit string includes data and parity bits associated with this data. The parity bits are redundant information to be used to decode the data. The data and a portion of the parity bits are transmitted in the initial transmission. Data and a parity bit P1 are transmitted in the initial transmission in the example depicted in FIG. 2A.

Figure 2B:
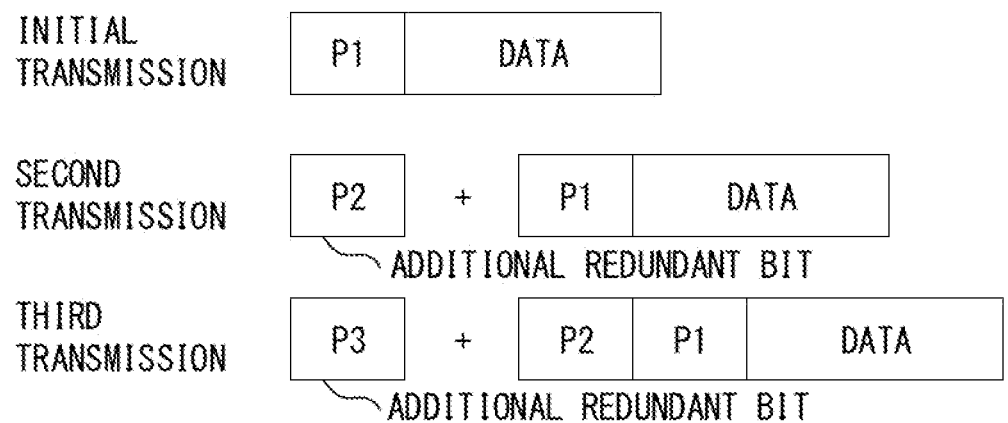

The destination device attempts to decode the data from the received bit string. In this case, as depicted in FIG. 2B, the destination device attempts to decode the data by using the parity bit P1. A retransmission is not performed when the data is correctly decoded. A retransmission is performed when the data is not correctly decoded.

A parity bit that has not been transmitted yet is transmitted in a retransmission (i.e., a second or following transmission). A parity bit transmitted in a second or following transmission process may hereinafter be referred to as an "additional redundant bit". For example, when the initial transmission fails, a parity bit P2 depicted in FIG. 2A may be transmitted as an additional redundant bit. The destination device attempts to decode the data from the previously received bit string and the newly received additional redundant bit. In this case, the destination device attempts to decode the data by using the parity bits P1 and P2, as depicted in FIG. 2B. In this way, the retransmission control is repeatedly performed until the data is correctly decoded. In this case, parity bits P3, P4 . . . are transmitted in this order as additional redundant bits.

FIG. 3 illustrates an example of a data transmission in accordance with embodiments of the invention. In this example, a wireless LAN system serves as a wireless transmission system and includes a plurality of wireless communication devices. Data is transmitted from a source device to a destination device. In the example depicted in FIG. 3, the source device sequentially transmits data D1, D2, and D3 to the destination device.

Although data is transmitted using one frequency band in the example depicted in FIG. 3, the wireless communication system 1 may transmit data by concurrently using a plurality of frequency bands. Although a Request to Send (RTS) frame is not used in the example depicted in FIG. 3, the source device may use an RTS frame prior to a data transmission. In addition, although the retransmission described above by referring to FIGS. 2A and 2B is performed in the example depicted in FIG. 3, the wireless communication system 1 does not necessarily need to perform the retransmission.

Upon acquiring a transmission right, the source device transmits data D1 to the destination device. In this example, data and a parity bit P1 are transmitted as depicted in FIGS. 2A and 2B. Assume that a Frame Check Sequence (FCS) error has occurred in the destination device. In this case, the destination device transmits a Clear to Send/Not Acknowledge (CTS/NACK) frame.

The CTS/NACK frame functions as a message for requesting a retransmission for the destination device. Accordingly, upon receipt of the CTS/NACK frame, the source device transmits an additional redundant bit P for the data D1 to the destination device. This additional redundant bit, which is a portion of a parity bit string generated in advance for the data D1, corresponds to an additional redundant bit P2 depicted in FIGS. 2A and 2B. A length of the additional redundant bit P is reported from the destination device to the source device by using a "Duration" in the CTS/NACK frame. The CTS/NACK frame may designate a modulation scheme to be used in transmitting the additional redundant bit.

When an additional redundant bit is transmitted, the ratio of the data relative to all transmitted bits (data and parity bits) is decreased. Thus, the coding rate is decreased. Accordingly, a data rate is substantially decreased when an additional redundant bit is transmitted due to a retransmission. For example, the data rate may indicate the amount of data (not including a parity bit) transmitted within a specified time period.

The CTS/NACK frame functions as a message for reporting a transmission prohibited period for other wireless communication device. In particular, none of the other wireless communication devices perform a data transmission for a period designated by the "Duration" in the CTS/NACK frame. Hence, the source device can transmit the additional redundant bit P to the destination device without a collision with any of the other wireless communication devices.

The destination device decodes the previously received data D1 by using the additional redundant bit P newly received from the source device. In this example, an FCS error is not detected. Accordingly, the destination device decides according to the quality of the received signal whether the data rate should be increased for a next data transmission (i.e., the initial transmission of data D2) to be performed by the source device. Assume that it is decided that the data rate should be increased for the initial transmission of data D2 in comparison with the data rate achieved when data D1 and the additional redundant bit P were transmitted. In this case, the destination device transmits a Clear to Send/Acknowledge (CTS/ACK) frame.

The CTS/ACK frame functions as a message for requesting an increase in the data rate for the source device. In this example, the CTS/ACK frame includes information indicating a data rate. Accordingly, using the CTS/ACK frame, the destination device designates a data rate for the next data transmission (i.e., the initial transmission of data D2) to be performed by the source device. Note that the data rate is expressed by a modulation scheme and a coding rate, as will be described in detail hereinafter.

Upon receipt of the CTS/ACK frame, the source device performs the next data transmission (i.e., the initial transmission of data D2) at the data rate designated by the CTS/ACK frame. Hence, the data rate for data D2 is higher than the data rate for data D1 (the data rate achieved when data D1 and the additional redundant bit P are transmitted in the example depicted in FIG. 3).

The CTS/ACK frame functions as a message for reporting a transmission prohibited period for the other wireless communication device, as with the CTS/NACK frame. In this example, however, the "Duration" in the CTS/ACK frame is "zero". Hence, data transmission is not prohibited for any of the wireless communication devices.

Data D3 transmitted from the source device is received by the destination device. Assume that an FCS error is not detected in the destination device. Meanwhile, the destination device decides according to the quality of the received signal whether the data rate should be increased for a next data transmission (i.e., the initial transmission of data D3) to be performed by the source device. In this example, it is decided that the data rate does not need to be increased for the initial transmission of data D3. In this case, the destination device transmits an ACK frame.

The ACK frame functions as a message for requesting the data rate to be maintained for the source device. Accordingly, upon receipt of the ACK frame, the source device recognizes that data D2 has been correctly decoded by the destination device and transmits data D3 at the same data rate as the one at which data D2 was transmitted. The ACK frame functions as a message for reporting a transmission prohibited period for the other wireless communication device, as with the CTS/NACK frame and the CTS/ACK frame. In this example, however, the "Duration" in the ACK frame is "zero". Hence, data transmission is not prohibited for any of the wireless communication devices.

FIG. 4 illustrates an example of a control frame to be used in the wireless communication system depicted in FIG. 3. The control frame includes a CTS frame and an ACK frame. In this example, a CTS frame may be used as a CTS/ACK frame or CTS/NACK frame (descriptions will be given of the CTS/ACK frame and the CTS/NACK frame hereinafter).

The control frame includes frame control information (Frame Control), duration information (Duration), destination information (RA: Receiver Address), and Frame Check Sequence (FCS). Frame control information includes a "type" of two bits and a "subtype" of four bits. The "type" indicates whether the frame is a control frame. The "subtype" identifies whether the frame is a CTS frame, an ACK frame, or the like. The "duration information" designates a period during which transmission is prohibited for other wireless communication devices (NAV: Network Allocation Vector). As described above, however, a source device that has received a CTS/NACK frame identifies the duration information as information indicating the length of an additional redundant bit to be transmitted in a retransmission process.

In this example, the control frame (including a CTS frame and an ACK frame) is stored in a PLCP protocol data unit (PPDU) frame for transmission. In this case, the control frame is stored in a PSDU area in the PPDU frame, as depicted in FIG. 5.

The PPDU frame includes a Physical Layer Convergence Procedure (PLCP) header. The PLCP header includes a "rate (RATE)" of four bits. In the sequence depicted in FIG. 3, the destination device reports a data rate or a change in the data rate to the source device by using the "rate" in the PLCP header.

FIGS. 6A-6C illustrate examples of methods for reporting a data rate for a next communication transaction. A communication transaction indicates a communication process starting from a source device transmitting data to a destination device responding to this data transmission. In the example depicted in FIG. 3, a series of communication processes starting from the source device transmitting data D1 to the destination device transmitting a CTS/NACK frame corresponds to one communication transaction. In this case, the next communication transaction corresponds to a series of communication processes starting from the source device transmitting the additional redundant bit P to the destination device transmitting a CTS/ACK frame.

The rate information in a PLCP header is originally intended to indicate a combination of a modulation scheme and a coding rate for the PPDU frame. For example, as depicted in FIGS. 6A-6C, "1101" may indicate a combination of "BPSK" and "coding rate: ½", and "1111" may indicate a combination of "BPSK" and "coding rate: ¾". Hence, a wireless communication device that has received a PPDU frame may recognize a modulation scheme and coding rate of a signal in the PPDU frame by referring to the rate information.

However, when the PPDU frame is the control frame depicted in FIG. 3 (including a CTS frame and an ACK frame), the rate information in the PLCP header indicates, for the source device, a combination of a modulation scheme and coding rate of the PPDU frame as well as a data rate for a next communication transaction or a change to be made in the data rate for the next communication transaction. Accordingly, the source device can recognize a data rate designated by the destination device for the next communication transaction by referring to the rate information in the PLCP header. Note that a data rate may be indicated by at least one of a modulation scheme and a coding rate or a combination of a modulation scheme and a coding rate.

FIG. 6A depicts an example of a method for reporting communication parameters pertaining to a retransmission by using a CTS/NACK frame. In this example, a modulation scheme is designated as a communication parameter pertaining to a retransmission (i.e., transmission of an additional redundant bit). In this case, a destination device determines, according to, for example, the quality of a received signal, a modulation scheme for the retransmission and registers a 4-bit value indicating the determined modulation scheme in the "rate" in a PLCP header. Upon receipt of the CTS/NACK frame, the source device transmits an additional redundant bit by using the modulation scheme indicated by the "rate" in the CTS/NACK frame.

FIG. 6B depicts an example of a method for reporting communication parameters pertaining to a next initial transmission by using a CTS/ACK frame. In this example, a modulation scheme and a coding rate are designated for the next initial transmission as communication parameters. The coding rate may directly indicate the value of the coding rate or may indicate a specific change to be made in the coding rate. Assume that available coding rates (e.g., ⅓, ½, ⅔, ¾, ⅚) have been determined in advance for the wireless communication system 1. In this case, the number of levels the coding rate is to be changed may be indicated as a communication parameter for a next communication transaction.

A destination device determines, according to, for example, the quality of a received signal, a combination of a modulation scheme and a coding rate for the initial transmission of next data and registers a 4-bit value indicating the determined combination in the "rate" in a PLCP header. Upon receipt of the CTS/ACK frame, the source device transmits the next data by using the modulation scheme and coding rate indicated by the "rate" in the CTS/ACK frame.

FIG. 6C depicts another example of a method for reporting communication parameters pertaining to an initial transmission of next data by using a CTS/ACK frame. In this example, one of a modulation scheme and a coding rate is maintained, and the other is changed. The modulation scheme may indicate the number of levels a modulation order is to be changed. Note that the modulation order indicates the number of bits transmitted in one symbol. In particular, the modulation orders of BPSK, QPSK, 16QAM, and 64QAM are 1, 2, 4, and 6, respectively.

As described above, the wireless communication system in accordance with embodiments of the invention is such that a data rate for a next communication transaction is reported from a destination device to a source device by using an existing control frame. In this case, the definition of the control frame is not changed. For example, rate information in a PLCP header may indicate a combination of a modulation scheme and coding rate of the PPDU frame as well as a data rate for the next communication transaction or a change to be made in a data rate for the next communication transaction. Hence, even an existing wireless communication device may perform the rate control in accordance with embodiments of the invention.

However, a destination device may need to transmit a control frame in accordance with a communication parameter that corresponds to a data rate for a next communication transaction. In the example depicted in FIG. 6A, "rate=1111" is registered in the header of a control frame when a source device is instructed to perform a retransmission based on QPSK. In this case, the destination device transmits a CTS/NACK frame in accordance with the modulation scheme "BPSK" and coding rate "3/4" that correspond to "1111".

The "Duration" in a CTS/ACK frame and an ACK frame in the wireless communication system in accordance with embodiments of the present invention is zero. Hence, wireless communication devices other than a destination device will not have a waiting time with respect to the "Duration".

In the examples described above, a data rate for a next transaction is reported using the rate information in a PLCP header. However, the present invention is not limited to this scheme. For example, a data rate for a next transaction may be reported using the service area in the PLCP header depicted in FIG. 5. The service area consists of 16 bits. The data rate for the next communication transaction is reported from the destination device to the source device by using, for example, the low four bits of the service area. In this case, as depicted in FIG. 7, a modulation scheme may be designated by two bits, and a coding rate may be designated by two bits.

The low four bits of a service area are originally intended to be used as scrambler initial values. Accordingly, after initial settings are made, the low four bits of a service area will not be used for the scrambler. Hence, using the low four bits of the service area so as to report a data rate for a next communication transaction has essentially no influences on an existing standard or wireless communication device.

Figure 8:
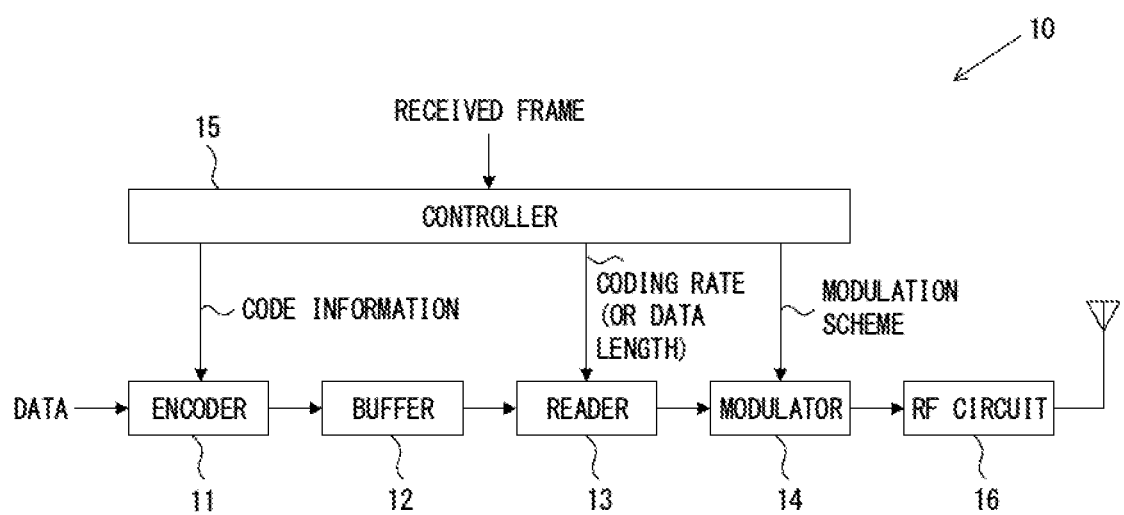
FIG. 8 illustrates an example of a transmitter implemented in a wireless communication device.

FIG. 8 illustrates an example of a transmitter implemented in a wireless communication device. As depicted in FIG. 8, a transmitter 10 includes an encoder 11, a buffer 12, a reader 13, a modulator 14, a controller 15, and an RF circuit 16. The transmitter 10 may include circuit elements that are not depicted in FIG. 8.

The encoder 11 generates a coded bit string by coding input data in accordance with an instruction from the controller 15. In this case, the controller 15 gives the encoder 11 an instruction that includes code information indicating a code type. Thus, the encoder 11 generates a coded bit string by coding the input data in accordance with the code type designated by the controller 15. The coded bit string includes data and parity bits, as depicted in FIGS. 2A and 2B. The coded bit string generated by the encoder 11 is stored in the buffer 12.

In accordance with an instruction from the controller 15, the reader 13 reads a portion of the coded bit string stored in the buffer 12. In the initial transmission, the reader 13 reads the data and a portion of the parity bit string (i.e., parity bit P1) from the buffer 12, as depicted in FIGS. 2A and 2B. In this case, according to a coding rate reported from the destination device, the controller calculates a parity length to be set for the data. In a retransmission process, the reader 13 reads a portion of the parity bit string (i.e., an additional redundant bit) from the buffer 12. In this case, the controller 15 calculates a length for the additional redundant bit according to the value of the "Duration" in a CTS/NACK frame received from the destination device.

In accordance with an instruction from the controller 15, the modulator 14 generates a modulated signal by modulating the bit string read by the reader 13. A modulation scheme is reported from the destination device. However, the modulation scheme at the start of a communication may be designated in advance by the user.

The controller 15 controls operations of the transmitter 10. In particular, the controller 15 can control operations of the encoder 11, the reader 13, and the modulator 14. In this case, the controller 15 gives the encoder 11 an instruction indicating a code type. The controller 15 also gives the reader 13 an instruction indicating the length of a bit string to be read from the buffer 12. In addition, the controller 15 gives the modulator 14 an instruction indicating the modulation scheme. Note that the controller 15 may be implemented by a processor system that includes a processor element and a memory. Alternatively, the controller 15 may be implemented by a digital signal processing circuit.

The RF circuit 16 generates an RF modulated signal by upconverting the modulated signal output from the modulator 14 into a signal in a transmission frequency band (RF band). The RF modulated signal is output via an antenna.

FIG. 9 illustrates an example of a receiver implemented in a wireless communication device. As depicted in FIG. 9, a receiver 20 includes a down convert circuit 21, a demodulator 22, a decoder 23, a buffer 24, and a controller 25. The receiver 20 may include circuit elements that are not depicted in FIG. 9.

An RF modulated signal output from the transmitter 10 depicted in FIG. 8 arrives at the receiver 20. The down convert circuit 21 down-converts the RF modulated signal received via an antenna into a baseband signal.

The demodulator 22 demodulates an output signal of the down convert circuit 21 in accordance with an instruction from the controller 25. The demodulation process performed by the demodulator 22 corresponds to the modulation process performed by the modulator 14 depicted in FIG. 8.

In accordance with an instruction from the controller 25, the decoder 23 decodes the demodulated signal output from the demodulator 22. In particular, the decoder 23 decodes a received bit string. The controller 25 may designate a decoding repetition count. In this case, the decoder 23 repeatedly performs a decoding process the number of times designated by the controller 25. When the decoder 23 fails in decoding the received data, the decoder 23 reports this fact to the controller 25.

The buffer 24 stores a demodulated signal output from the demodulator 22. When a retransmission is performed by the source device, the decoder 23 performs a decoding process on the demodulated signal stored in the buffer 24 and a demodulated signal (e.g., a likelihood value that corresponds to an additional redundant bit string) newly output from the demodulator 22.

The controller 25 controls operations of the receiver 20. In particular, the controller 25 can control operations of the demodulator 22 and the decoder 23. The controller 25 includes a SNR estimator 26, a communication parameter determination unit 27, and a report unit 28. Note that the controller 25 may be implemented by a processor system that includes a processor element and a memory. Alternatively, the controller 25 may be implemented by a digital signal processing circuit.

The SNR estimator 26 estimates the signal-to-noise ratio (SNR) of a signal to be received from the transmitter 10 depicted in FIG. 8. For example, the SNR may be estimated by measuring the power of a specified area in a preamble of a received signal.

The communication parameter determination unit 27 determines a communication parameter for a next communication transaction according to the SNR of the received signal estimated by the SNR estimator 26. For example, when the next communication transaction is a retransmission (i.e., transmission of an additional redundant bit), the communication parameter determination unit 27 may determine a length and a data rate for the additional redundant bit. In this case, the length determined for the additional redundant bit is reported to the source device by using, for example, the "Duration" depicted in FIG. 4. The data rate is reported to the source device by using, for example, the "rate" depicted in FIG. 6A. When the next communication transaction is an initial transmission of new data, the communication parameter determination unit 27 determines a data rate for the next communication transaction. In this case, the data rate is reported to the source device by using, for example, the "rate" depicted in FIGS. 6B and 6C or the "scrambler initial value" depicted in FIG. 7.

The report unit 28 reports the communication parameter determined by the communication parameter determination unit 27 to the source device.

Determination of Communication Parameter

In the wireless communication system in accordance with embodiments of the present invention, a destination device that receives a data signal from a source device determines a communication parameter for a next communication transaction. For example, when an FCS error is detected, the destination device may determine, as a communication parameter, one or more of a length, a modulation scheme, and a coding rate for data to be retransmitted (i.e., an additional redundant bit). When an FCS error is not detected, the destination device may determine, as a communication parameter, a data rate (a combination of a modulation scheme and a coding rate) for an initial transmission of next data.

The communication parameter determination unit 27 calculates an evaluation value in determining the communication parameter described above. In this example, the evaluation value is expressed by formula (1).

$$\text{Evaluation Value} = R_1 N_{S,1} - \Sigma_{i=1}^{k} N_{S,i} C_i \quad (1)$$

$R_1$ indicates a coding rate for the initial transmission of data, and $N_{S,i}$ indicates a transmission data length for an i-th transmission. Hence, $N_{S,1}$ indicates the transmission data length for the initial transmission. A data length indicates a code length or a symbol length. $C_i$ indicates mutual information obtained in an i-th transmission. The first term (first value) in the right side of formula (1) indicates a target communication traffic volume, and the second term (second value) in the right side of formula (1) indicates a total estimated communication traffic volume for data transmitted in the transmissions starting from the first (initial) one to an i-th one, i.e., data transmitted in the transmissions up to the current one.

Mutual information C is calculated according to formula (2).

$$C_\chi(SNR) \triangleq L - \int_{v \in C} \frac{e^{-|v|^2}}{\pi 2^L} \sum_{x \in \chi} \sum_{l=1}^{L} \log_2\left(1 + \frac{D}{E}\right) dv \quad (2)$$

$$D = \sum_{\tilde{x} \in \chi : B_l(\tilde{x}) = 1 - B_l(x)} e^{-|\sqrt{SNR}(x-\tilde{x})+v|^2}$$

$$E = \sum_{\tilde{x} \in \chi : B_l(\tilde{x}) = B_l(x)} e^{-|\sqrt{SNR}(x-\tilde{x})+v|^2}$$

L indicates a modulation order that corresponds to a modulation scheme $\chi$. The modulation order indicates the number of bits transmitted in one symbol. For example, the modulation orders of BPSK, QPSK, 16QAM, and 64QAM may be 1, 2, 4, and 6, respectively. The second term of mutual information depends on a SNR and indicates a loss between the source device and the destination device. Thus, mutual information depends on a modulation scheme and a SNR and is obtained by subtracting a loss between the source device and the destination device from a modulation order L. In other words, mutual information substantially indicates the number of bits transmitted from the source device to the destination device in one symbol. Hence, mutual information is increased when a modulation scheme with a high modulation order is selected. When the communication environment is preferable and the SNR is high, the loss between the source device and the destination device is small, and hence mutual information becomes close to the modulation order L. Mutual information is decreased when the SNR is decreased. Note that the SNR is obtained by the SNR estimator 26.

The first term ($R_1 N_{S,1}$) of an evaluation value indicates the product of the coding rate of the initial transmission and the transmission data length of the initial transmission. The coding rate indicates the ratio of data to all transmitted bits. Hence, this value indicates the number of bits of data to be transmitted in accordance with a request from the source device. Thus, the first term ($R_1 N_{S,1}$) of an evaluation value may hereinafter be referred to as a "number of requested bits". Note that $R_1$ (the coding rate of an initial transmission) and $N_{S,1}$ (the transmission data length of the initial transmission) are known values.

The second term (the cumulative sum of $N_{S,i} C_i$) of an evaluation value substantially indicates the number of bits transmitted from the source device to the destination device. For example, $N_{S,1} C_1$ may indicate the number of bits transmitted in an initial transmission, and $N_{S,2} C_2$ may indicate the number of bits transmitted in a second transmission. Accordingly, the second term (the cumulative sum of $N_{S,i}C_i$) of an evaluation value may hereinafter be referred to as a "total number of transmitted bits".

As described above, an evaluation value indicates the difference between the number of requested bits and the total number of transmitted bits. The communication parameter determination unit 27 decides by using the evaluation value whether a current data rate is appropriate.

Case 1: Evaluation Value >Threshold 1

Figure 10A:
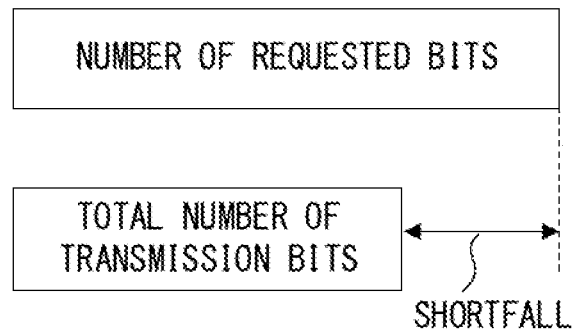
FIGS. 10A, 10B and 10C illustrate an evaluation value.

In case 1, the total number of transmitted bits is lower than the number of requested bits, as depicted in FIG. 10A. That is to say, as many bits as are sufficient for the number of requested bits have not been transmitted. As a result, the evaluation value is a positive value and higher than a specified threshold 1. Threshold 1 is zero or a specified positive value. The difference (i.e., evaluation value) between the number of requested bits and the total number of transmitted bits corresponds to a value indicating a shortfall with respect to the number of requested bit. In this case, the communication parameter determination unit 27 determines a communication parameter based on formula (3).

$$N_{s,k+1}C_{k+1} > R_1 N_{s,1} - \sum_{i=1}^{k} N_{s,i}C_i \qquad (3)$$

$N_{S,k+1}$ indicates a data length for a retransmission, and $C_{k+1}$ indicates mutual information for the retransmission. The mutual information for the retransmission is calculated according to the modulation order of a modulation scheme for the retransmission and a SNR. The SNR for the retransmission has not been detected at this moment, and hence, for example, a value most recently estimated by the SNR estimator 26 may be used.

In particular, the communication parameter determination unit 27 selects a modulation scheme that satisfies formula (3) and that minimizes data length ($N_{S,k+1}$) for the retransmission. Formula (3) may be satisfied when the length of the retransmission data (i.e., additional redundant bit) is greater than the shortfall depicted in FIG. 10A. However, a transmission time becomes long if the amount of retransmission data is excessively large. Accordingly, a modulation scheme that satisfies formula (3) and minimizes the data length ($N_{S,k+1}$) for the retransmission may be selected so that the shortfall after the previous data transmission can be compensated for in the shortest possible transmission time. Note that the right side of formula (3) corresponds to the evaluation value, which is calculated in advance. Mutual information ($C_{k+1}$) for the retransmission is calculated by selecting a modulation scheme for the retransmission.

Upon determining that a retransmission needs to be performed, the destination device reports a data length and a modulation scheme determined by the communication parameter determination unit 27 to the source device. In the example depicted in FIG. 3, this report is sent using a CTS/NACK frame. Then, the source device acquires a parity bit (e.g., P2 depicted in FIGS. 2A and 2B) from the buffer 12 according to the data length reported from the destination device. The source device transmits, as an additional redundant bit, the parity bit acquired from the buffer 12 to the destination device in accordance with the modulation scheme reported from the destination device.

Case 2: Evaluation Value<Threshold 2

Figure 10B:
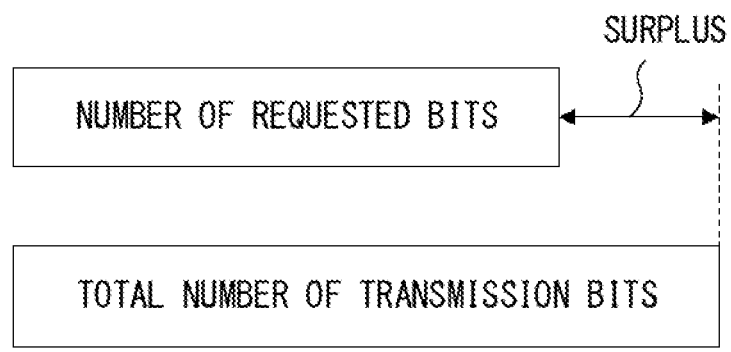

In case 2, the total number of transmitted bits is larger than the number of requested bits, as depicted in FIG. 10B. That is to say, data with an excessively large number of bits with respect to the number of requested bits has been transmitted. As a result, the evaluation value is a negative value and less than a specified threshold 2. Threshold 2 is zero or a specified negative value. The difference between the number of requested bits and the total number of transmitted bits (i.e., an evaluation value) corresponds to the number of surplus bits with respect to the number of requested bits. In this case, the communication parameter determination unit 27 determines a communication parameter based on formula (4).

$$R_1 N_{s,1} - \sum_{i=1}^{k} N_{s,i}C_i \leq 0 \qquad (4)$$

In particular, the communication parameter determination unit 27 selects a combination of a modulation scheme and a coding rate that satisfies formula (4) and maximizes the value of the left side of formula (4). The value of the second term of the left side of formula (4) needs to be decreased in order to increase the value of the left side of formula (4) (i.e., bring the value close to zero). Hence, a combination of a modulation scheme and a coding rate is selected for i=k so as to decrease the value of the second term of the left side of formula (4). For example, increasing the coding rate may decrease the amount of parity bits to be transmitted, thereby decreasing $N_{S,k}$.

The destination device reports the coding rate and modulation scheme determined by the communication parameter determination unit 27 to the source device. In the example depicted in FIG. 3, this report is sent using a CTS/ACK frame. Then, the source device acquires data and a parity bit (e.g., the data and P1 depicted in FIGS. 2A and 2B) from the buffer 12 according to the coding rate reported from the destination device. The source device transmits, as an additional redundant bit, the data and parity bit acquired from the buffer 12 to the destination device in accordance with the modulation scheme reported from the destination device. As a result, an initial transmission of new data is performed at a data rate higher than that for the previous data transmission.

Case 3: Threshold 2≤Evaluation Value≤Threshold 1

Figure 10C:
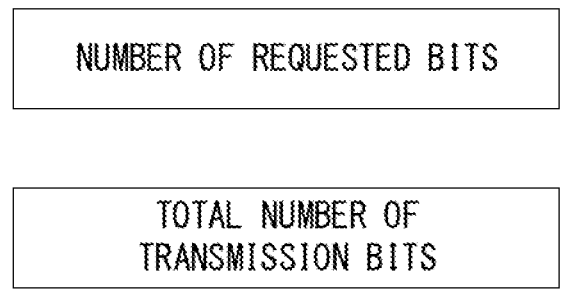

In case 3, the difference between the number of requested bits and the total number of transmitted bits falls within a specified threshold range, as depicted in FIG. 10C. When the absolute values of thresholds 1 and 2 are close to zero, the total number of transmitted bits is equal to or almost equal to the number of requested bits. In this case, the communication parameter determination unit 27 determines that the current data rate is appropriate for the number of requested bits. Accordingly, the communication parameter determination unit 27 determines that the current data rate should be maintained and maintains the current coding rate and modulation scheme.

When the communication parameter determination unit 27 determines that the current data rate should be maintained, the destination device reports this fact to the source device. In the example depicted in FIG. 3, this report is sent using an ACK frame. Then, the source device performs the initial transmission of new data at the same data rate as the one for the previous data transmission.

FIG. 11 is a flowchart illustrating an example of a process performed by a source device. For example, the process of this flowchart may be performed by the source device when data is supplied from an application to the transmitter 10 depicted in FIG. 8. The encoder 11 encodes and stores the supplied data in the buffer 12.

In S1, the source device acquires a transmission right. In S2, the source device performs a data transmission. As depicted in FIGS. 2A and 2B, data and a parity are transmitted in an initial transmission, and an additional redundant bit is transmitted in a retransmission. Then, the source device waits for a response frame to be transmitted from a destination device.

In S3-S5, the source device detects the type of a received frame. The source device can determine the type of the received frame by referring to the "type" and "subtype" in the frame control information (Frame Control) depicted in FIG. 4. The source device may determine that the received frame is a CTS/NACK frame when the control information indicates CTS and the "Duration" is not zero. The source device may determine that the received frame is a CTS/ACK frame when the control information indicates CTS and the "Duration" is zero.

When the received frame is a CTS/NACK frame, the source device refers to, in S6, the "rate" depicted in FIG. 5 and the "Duration" depicted in FIG. 4. The "rate" in the CTS/NACK frame indicates the modulation scheme and coding rate of this frame, as depicted in FIG. 6A. However, the "rate" in the CTS/NACK frame indicates, for the source device, the modulation scheme and coding rate of this frame as well as a modulation scheme for a retransmission. For example, "rate=1111" may indicate that QPSK is to be used for the retransmission. The "Duration" in the CTS/NACK frame indicates a retransmission data length for the source device. The source device can calculate the number of additional redundant bits according to the data length and the modulation scheme of the retransmission. A coding rate can be calculated by the number of the additional redundant bits. In this way, the source device sets a modulation scheme and a coding rate for the next retransmission by referring to the "rate" and the "Duration".

In S7-S8, the source device increments a retransmission count and decides whether the retransmission count has reached a maximum retransmission count determined in advance. When the retransmission count has not reached the maximum retransmission count, the process of the source device returns to S1. In this case, the source device transmits an additional redundant bit in S2. When the retransmission count has reached the maximum retransmission count, the source device initializes the retransmission count in S10. In this case, no further retransmissions will be performed.

When the received frame is a CTS/ACK frame, the source device refers to, in S9, the "rate" depicted in FIG. 5. The "rate" in the CTS/ACK frame indicates the modulation scheme and coding rate of this frame, as depicted in FIGS. 6B and 6C. However, the "rate" in the CTS/ACK frame indicates, for the source device, the modulation scheme and coding rate of this frame as well as a modulation scheme and a coding rate for an initial transmission of next data. For example, "rate=1001" may indicate that 16QAM is to be used for the initial transmission of next data and that a parity is to be added to the data at a coding rate that is lower than the current coding rate by N levels.

When the received frame is an ACK frame, the source device ends the process without making a rate change. When the received frame is not any of a CTS/NACK frame, a CTS/ACK frame, and an ACK frame, the source device determines that the data transmitted in S2 has not been successfully received by the destination device. In this case, the process of the source device moves to S7. Thus, a retransmission is performed.

As described above, the source device performs a retransmission (i.e., a transmission of an additional redundant bit) upon receipt of a CTS/NACK frame. A length of the additional redundant bit and a modulation scheme in the retransmission are respectively set in S6. When a CTS/ACK frame is received, the source device sets in S9 a modulation scheme and a coding rate for the initial transmission of next data. Then, when new data is supplied, the source device transmits this data in accordance with the modulation scheme and coding rate set in S9.

In the flowchart depicted in FIG. 11, a rate change is reported using the "rate" in a CTS/NACK frame or a CTS/ACK frame. However, the present invention is not limited to this scheme. In particular, when a rate change is reported using areas provided for scrambler initial values in the service fields depicted in FIG. 7, the source device determines, in S6 or S9, a modulation scheme and/or a coding rate by referring to values registered in areas provided for the scrambler initial values.

When a CTS/NACK frame is received, other communication devices do not perform a transmission process for a period designated by the "Duration". However, the "Duration" in a CTS/ACK frame and an ACK frame are zero. Accordingly, the other communication devices may immediately start a transmission process when a CTS/ACK frame or an ACK frame is received.

Figure 12:
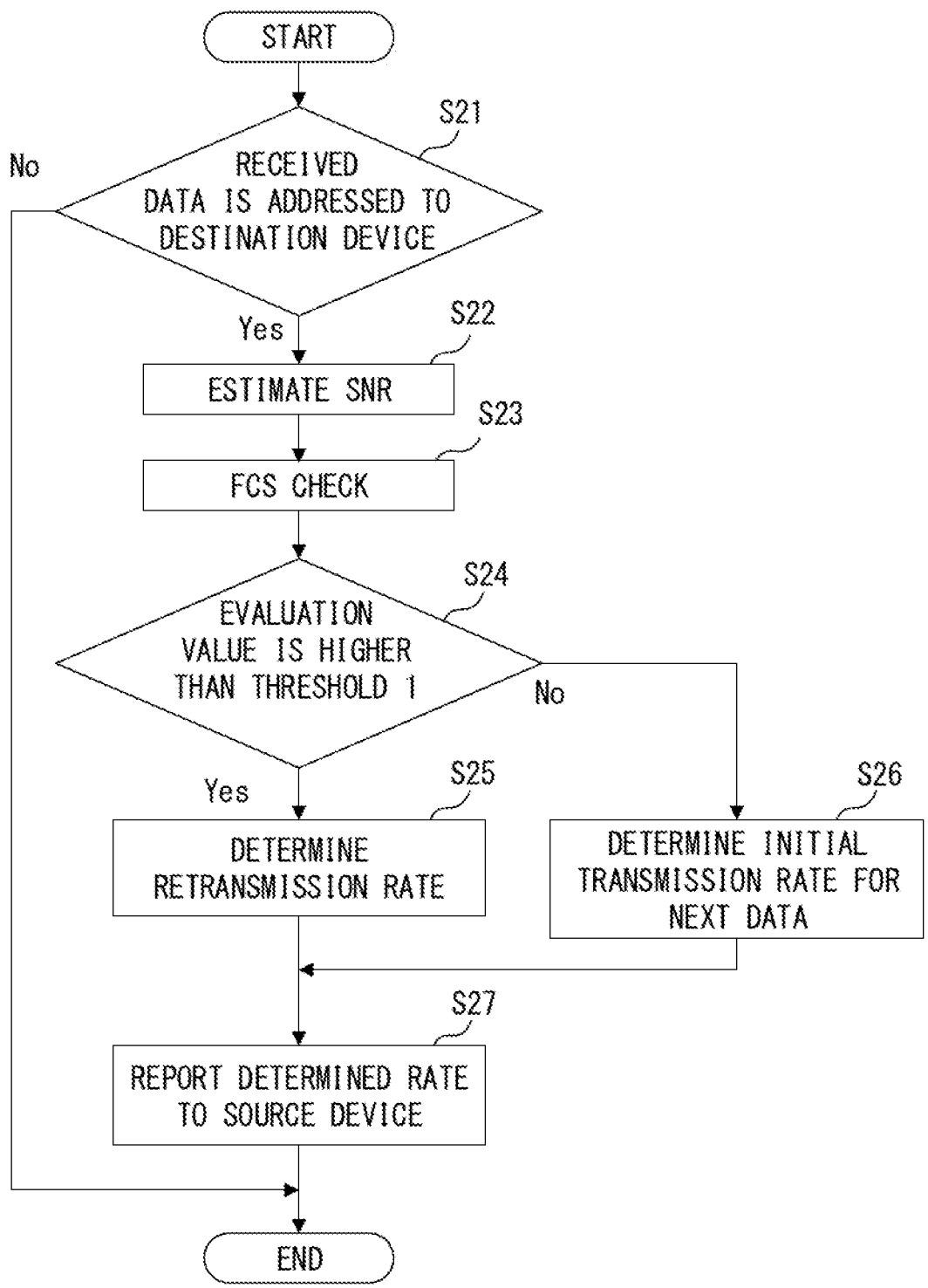
FIG. 12 is a flowchart illustrating an example of process performed by a destination device.

FIG. 12 is a flowchart illustrating an example of a process performed by a destination device. The process of this flowchart is performed when a frame arrives at the destination device.

In S21, the destination device decides whether received data is addressed to this destination device by referring to the destination address of the received frame. When the received data is addressed to the destination device, the destination device estimates the SNR of the received signal in S22. In S23, the destination device determines the presence/absence of an error by performing frame check sequence (FCS) check.

In S24, the destination device calculates an evaluation value based on the estimated SNR. Then the destination device decides whether the evaluation value is higher than threshold 1. When the evaluation value is higher than threshold 1, the destination device determines a retransmission rate in S25. When the evaluation value is lower than or equal to threshold 1, the destination device determines an initial transmission rate for next data in S26. In S27, the destination device reports the rate determined in S25 or S26 to the source device. The destination device does not perform the processes of S22-S27 when the received data is not addressed to this destination device.

The destination device may perform the process of S25 when an FCS error is detected and the evaluation value is higher than threshold 1. The destination device may perform the process of S26 when an FCS error is not detected and the evaluation value is lower than or equal to threshold 1.

FIG. 13 is a flowchart illustrating an example of a process of determining a retransmission rate. The process of this flowchart corresponds to S25 depicted in FIG. 12. The process of this flowchart is performed by the communication parameter determination unit 27 and the report unit 28.

The communication parameter determination unit 27 performs processes of S31-S34 for each modulation scheme available for a communication between wireless communication devices 2 and 3. For example, the available modulation schemes may be, but are not particularly limited to, BPSK, QPSK, 16QAM, and 64QAM.

In S31, the communication parameter determination unit 27 calculates a retransmission data length that corresponds to a selected modulation scheme. In this case, the communication parameter determination unit 27 calculates the retransmission data length by using formula (3). In particular, mutual information $C_{k+1}$ is calculated by assigning the modulation order L of the selected modulation scheme to formula (2). The right side of formula (3), which corresponds to an evaluation value, is calculated in advance in S24 depicted in FIG. 12. The communication parameter determination unit 27 calculates a possibly smallest $N_{S,k+1}$ that satisfies formula (3). As a result, a retransmission data length (i.e., $N_{S,k+1}$) that corresponds to the selected modulation scheme is calculated.

In S32, the communication parameter determination unit 27 calculates a cumulative coding rate by using the retransmission data length calculated in S31. The cumulative coding rate indicates a ratio between the data and parity transmitted in the initial transmission and the retransmission. In the examples depicted in FIGS. 2A and 2B, the process of calculating a retransmission data length for the second transmission involves calculating a cumulative coding rate based on data, P1 and P2. The process of calculating a retransmission data length for the third transmission involves calculating a cumulative coding rate based on data, P1, P2, and P3.

In S33, the communication parameter determination unit 27 decides whether the cumulative coding rate calculated in S31 falls within a specified threshold range designated in advance. For example, the threshold range may be, but is not particularly limited to, ⅓ to ⅚. When the cumulative coding rate falls within the threshold range, the communication parameter determination unit 27 stores, in S34, information indicating the retransmission data length calculated in S31 in a memory. S34 is skipped when the cumulative coding rate does not fall within the threshold range.

In S35, the communication parameter determination unit 27 refers to the information stored in the memory that indicate retransmission data lengths calculated for individual modulation schemes and selects the shortest of these retransmission data lengths. In S36, the communication parameter determination unit 27 selects a modulation scheme that corresponds to the shortest retransmission data length.

In S37, the communication parameter determination unit 27 selects a communication pattern that corresponds to the modulation scheme selected in S36. Assume that one of the communication patterns depicted in FIG. 6A is used. In this case, for example, "1111" may be selected as the communication pattern when QPSK is selected in S36.

In S38, the communication parameter determination unit 27 calculates a "Duration" based on the retransmission data length selected in S35. The "Duration" corresponds to a time required to transmit retransmission data. In this example, the symbol rate is fixed.

In S39, the report unit 28 reports the communication parameters determined in S31-S38 to the source device. The reported communication parameters include the communication pattern obtained in S37 and the "Duration" obtained in S38. This report is sent by transmitting a CTS/NACK frame to the source device. The communication patterns are registered in the "rate" depicted in FIG. 5.

Figure 14:
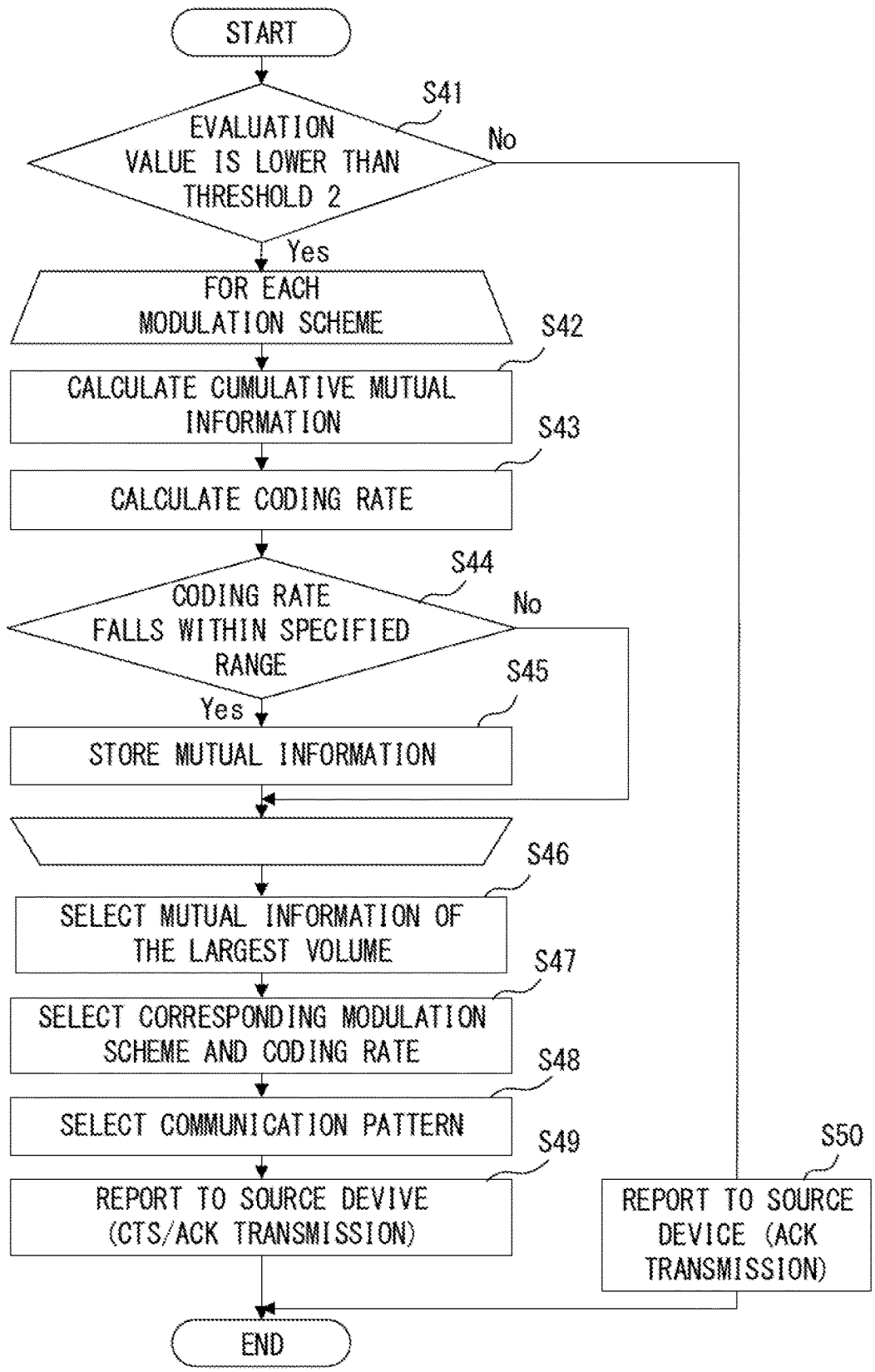
FIG. 14 is a flowchart illustrating an example of a process of determining an initial transmission rate for next data.

FIG. 14 is a flowchart illustrating an example of a process of determining an initial transmission rate for next data. The process of this flowchart corresponds to S26 depicted in FIG. 12. The process of this flowchart is performed by the communication parameter determination unit 27 and the report unit 28.

In S41, the communication parameter determination unit 27 decides whether the evaluation value calculated in S24 is lower than threshold 2. When the evaluation value is lower than threshold 2, the process of the communication parameter determination unit 27 moves to S42. The evaluation value being lower than threshold 2 corresponds to a situation in which a total number of transmitted bits that depends on a communication quality is larger than the number of required bits. Hence, when the evaluation value is lower than threshold 2, an excessively high communication quality is performed by the current communication parameter. Accordingly, the communication parameter determination unit 27 increases the rate for the initial transmission of next data through S41-S48. For example, the rate may be increased by increasing the coding rate.

The communication parameter determination unit 27 performs processes of S42-S45 for each individual modulation scheme available for a communication between wireless communication devices 2 and 3. For example, the available modulation schemes may be BPSK, QPSK, 16QAM, and 64QAM, as described above.

In S42, the communication parameter determination unit 27 calculates cumulative mutual information. For example, the cumulative mutual information may be the second term of the left side of formula (4) (i.e., cumulative sum of $N_{S,i}C_i$). Mutual information depends on the SNR of a received signal and the modulation order of a modulation scheme.

In S43, the communication parameter determination unit 27 calculates a coding rate. In this case, the communication parameter determination unit 27 determines a coding rate that satisfies formula (4) and that maximizes the value of the left side of formula (4).

In S44, the communication parameter determination unit 27 decides whether the coding rate calculated in S43 falls within a specified threshold range designated in advance. For example, the threshold range may be ⅓ to ⅚, as in the example depicted in FIG. 13. When the coding rate falls within the threshold range, the communication parameter determination unit 27 stores, in S45, the mutual information calculated in S42 in a memory. S45 is skipped when the coding rate does not fall within the threshold range.

In S46, the communication parameter determination unit 27 refers to the mutual information stored in the memory that have been calculated for individual modulation schemes and selects mutual information of the largest value. In S47, the communication parameter determination unit 27 selects a modulation scheme that corresponds to the mutual information of the largest value and obtains a coding rate calculated for this modulation scheme.

In S48, the communication parameter determination unit 27 selects a communication pattern that corresponds to a combination of the modulation scheme and coding rate selected in S47. In this example, coding rates available for the wireless communication system have been designated. As an example, five designated coding rates (e.g., ⅓, ½, ⅔, ¾, ⅚) may be prepared. In this case, the communication parameter determination unit 27 may select one of the designated coding rates that is the closest to the coding rate selected in S47.

This example is based on the assumption that: one of the communication patterns depicted in FIG. 6B is used, where N=1; 16QAM is selected in S47; and the coding rate selected in S47 is higher than the current coding rate by one level. In this case, "1011" is selected as the communication pattern.

In S49, the report unit 28 reports the communication parameters determined in S42-S48 to the source device. This report is sent by transmitting a CTS/ACK frame to the source device. The communication patterns are registered in the "rate" depicted in FIG. 5. However, zero is registered in the "Duration" in the CTS/ACK frame.

When the evaluation value is equal to or higher than threshold 2, the process of the communication parameter determination unit 27 moves to S50. The process of the flowchart depicted in FIG. 14 is performed when the evaluation value is lower than or equal to threshold 1 (S24 in FIG. 12: No). Accordingly, the process of S50 is performed when the evaluation value falls within a range from threshold 2 to threshold 1. In this example, threshold 2 is a negative value close to zero, and threshold 1 is a positive value close to zero. In this case, the process of S50 is performed when the evaluation value is zero or almost zero.

When the evaluation value falls within a range from threshold 2 to threshold 1, the communication parameter determination unit 27 determines that the current data rate is appropriate for the number of requested bits. In this case, the report unit 28 reports, to the source device, a signal indicating that the data rate is to be maintained. This report is sent by transmitting an ACK frame to the source device. However, zero is registered in the "Duration" in the ACK frame.

In the flowcharts depicted in FIGS. 12-14, a rate change is reported using the "rate" in a CTS/NACK frame or a CTS/ACK frame. However, the present invention is not limited to this scheme. In particular, when a rate change is reported using areas provided for scrambler initial values in the service fields depicted in FIG. 7, the destination device registers, in S39 or S49, communication patterns in the areas provided for the scrambler initial values.

Another Embodiment

The wireless communication system may transmit data by concurrently using a plurality of frequency bands. In the example depicted in FIG. 1, the wireless communication system 1 can transmit data by concurrently using two or more frequency bands among a 920 MHz band, a 2.4 GHz band, and a 5 GHz band.

Even in a case where data is transmitted by concurrently using a plurality of frequency bands, the data rate is controlled for the next transaction by using a method similar to a method used in a case where data is transmitted using one frequency band. In a case where a plurality of frequency bands are used, however, an evaluation value is expressed by formula (5).

$$\text{Evaluation Value} = R_1 N_{S,1} - \Sigma_{i=1}^{k} N_{S,i} \Sigma_{j=1}^{F} C_{i,j} \quad (5)$$

In this formula, j indicates a variable for identifying a frequency band. Thus, $C_{i,j}$ indicates mutual information provided when an i-th data transmission in a frequency band j is performed. F indicates the number of available frequency bands. Formula (5) is the same as formula (1) when F is 1 (i.e., when data is transmitted using only one frequency band).

When an FCS error is detected in the destination device and the evaluation value is a positive value, a modulation scheme that satisfies formula (6) and minimizes a data length $N_{S,k+1}$, for a retransmission is selected. In this case, different modulation schemes may be used for individual frequency bands.

$$N_{s,k+1} \sum_{j=1}^{F} C_{k+1,j} > R_1 N_{s,1} - \sum_{i=1}^{k} N_{s,i} \sum_{j=1}^{F} C_{i,j} \quad (6)$$

When an FCS error is not detected in the destination device and the evaluation value is a negative value, a combination of a modulation scheme and a coding rate that satisfies formula (7) and maximizes the value of the left side of formula (7) is selected. In this case, different modulation schemes may be used for individual frequency bands.

$$R_1 N_{s,1} - \sum_{i=1}^{k} N_{s,i} \sum_{j=1}^{F} C_{i,j} \le 0 \quad (7)$$

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication device comprising a processor configured
   to estimate a quality of a received signal that is transmitted from a source device,
   to determine a communication parameter indicating at least one of a next data length for a next communication transaction, a next modulation scheme for the next communication transaction, and a next coding rate for the next communication transaction, based on an evaluation value that indicates a result of subtracting a second value from a first value,
   the first value being determined based on a coding rate of a data signal received from the source device and a data length of the data signal received from the source device,
   the second value being determined based on the data length of the data signal received from the source device, a modulation scheme of the data signal received from the source device and the quality of the data signal received from the source device,
   wherein the determining of the communication parameter includes:
   to determine the modulation scheme and the coding rate for the next communication transaction based on the quality of the data signal; and
   to register the communication parameter,
   wherein the communication parameter indicates the modulation scheme and the coding rate for the next communication transaction in a rate area in a Clear to Send (CTS) frame or in an area provided for a scrambler initial value within a service area in the CTS frame,
   the CTS frame being a frame that gives a transmission grant to the source device and that reports a transmission prohibited period to another wireless device; and to report from the wireless communication device to the source device the determined communication parameter indicating the at least one of the next data length, the next modulation scheme, and the next coding rate, wherein the reporting of the determined communication parameter includes transmitting the CTS frame in which the communication parameter is registered to the source device, wherein the processor is configured to calculate mutual information that indicates a number of bits transmitted in one symbol by subtracting a loss corresponding to the quality of the data signal from a modulation order of the modulation scheme of the data signal, wherein the processor is configured to calculate the second value based on the data length of the data signal and the mutual information, and wherein in response to the processor determining that the evaluation value is a negative value and is lower than a second threshold, the processor is configured to determine, for a communication transaction directed to new data, a communication parameter for designating a data rate higher than a data rate of the data signal in accordance with the evaluation value.

2. The wireless communication device according to claim 1, wherein in response to the processer determining that the evaluation value is a positive value and is higher than a first threshold, the processor is configured to determine a communication parameter for requesting a redundant bit generated by the source device in association with data transmitted using the data signal.

3. The wireless communication device according to claim 2, wherein in response to the wireless communication device receiving a retransmission data signal that includes the redundant bit from the source device, the processor is configured to calculate the second value by adding a value determined based on a data length of the retransmission data signal, a modulation scheme of the retransmission data signal and a quality of the retransmission data signal to a value determined based on the data length of the received data signal, the modulation scheme of the received data signal and the quality of the received data signal.

4. A communication report method used in a wireless communication system in which a signal is transmitted in Carrier Sense Multiple Access Collision Avoidance (CSMA/CA) scheme, the method comprising:

estimating, by a processor of a wireless communication device, a quality of a received data signal that is transmitted from a source device;

determining, by the processor of the wireless communication device, a communication parameter indicating at least one of a next data length for a next communication transaction, a next modulation scheme for the next communication transaction, and a next coding rate for the next communication transaction, based on an evaluation value that indicates a result of subtracting a second value from a first value, the first value being determined based on a coding rate of a data signal received from the source device and a data length of the data signal received from the source device, the second value being determined based on the data length of the data signal received from the source device, a modulation scheme of the data signal received from the source device and the quality of the data signal received from the source device, wherein the determining of the communication parameter includes:

determining the modulation scheme and the coding rate for the next communication transaction based on the quality of the data signal; and registering the communication parameter, wherein the communication parameter indicates the modulation scheme and the coding rate for the next communication transaction in a rate area in a Clear to Send (CTS) frame or in an area provided for a scrambler initial value within a service area in the CTS frame, the CTS frame being a frame that gives a transmission grant to the source device and that reports a transmission prohibited period to another wireless device; and reporting, by the processor of the wireless communication device, from the wireless communication device to the source device the determined communication parameter indicating the at least one of the next data length, the next modulation scheme, and the next coding rate, wherein the reporting of the determined communication parameter includes transmitting the CTS frame in which the communication parameter is registered to the source device, wherein the method further comprises calculating, by the processor of the wireless communication device, mutual information that indicates a number of bits transmitted in one symbol by subtracting a loss corresponding to the quality of the data signal from a modulation order of the modulation scheme of the data signal, wherein the method further comprises calculating, by the processor of the wireless communication device, the second value based on the data length of the data signal and the mutual information, and wherein the method further comprises, in response to the processor determining that the evaluation value is a negative value and is lower than a second threshold, determining, by the processor of the wireless communication device, for a communication transaction directed to new data, a communication parameter for designating a data rate higher than a data rate of the data signal in accordance with the evaluation value.

5. The communication report method according to claim 1, wherein the transmission prohibited period registered in the CTS frame is zero.

* * * * *